(12) United States Patent
Stephens

(10) Patent No.: US 9,210,466 B2
(45) Date of Patent: Dec. 8, 2015

(54) SYSTEMS AND METHODS FOR CONTROLLING BROADCAST AUDIO VOLUME

(71) Applicant: Delia Stokes Stephens, Austin, TX (US)

(72) Inventor: Delia Stokes Stephens, Austin, TX (US)

(*) Notice: Subject to any disclaimer, the term of this patent is extended or adjusted under 35 U.S.C. 154(b) by 78 days.

(21) Appl. No.: 14/132,353

(22) Filed: Dec. 18, 2013

(65) Prior Publication Data

US 2015/0172754 A1    Jun. 18, 2015

(51) Int. Cl.
| | |
|---|---|
| H04H 60/33 | (2008.01) |
| H04N 21/439 | (2011.01) |
| H04N 21/422 | (2011.01) |
| H04N 21/441 | (2011.01) |
| H04N 21/435 | (2011.01) |
| H04N 21/81 | (2011.01) |
| H04N 5/60 | (2006.01) |
| H04N 21/45 | (2011.01) |
| H04N 21/25 | (2011.01) |
| H04N 21/8352 | (2011.01) |
| H04N 21/485 | (2011.01) |
| H04N 21/6543 | (2011.01) |
| H04N 21/658 | (2011.01) |

(52) U.S. Cl.
CPC ............ *H04N 21/4396* (2013.01); *H04N 5/60* (2013.01); *H04N 21/251* (2013.01); *H04N 21/252* (2013.01); *H04N 21/42204* (2013.01); *H04N 21/435* (2013.01); *H04N 21/441* (2013.01); *H04N 21/4532* (2013.01); *H04N 21/4852* (2013.01); *H04N 21/658* (2013.01); *H04N 21/6543* (2013.01); *H04N 21/812* (2013.01); *H04N 21/8106* (2013.01); *H04N 21/8352* (2013.01)

(58) Field of Classification Search
None
See application file for complete search history.

(56) References Cited

U.S. PATENT DOCUMENTS

| | | | | |
|---|---|---|---|---|
| 6,771,316 | B1* | 8/2004 | Iggulden | 348/553 |
| 2002/0133817 | A1* | 9/2002 | Markel | 725/23 |
| 2003/0093790 | A1* | 5/2003 | Logan | G06F 17/30265 |
| | | | | 725/38 |
| 2006/0218573 | A1* | 9/2006 | Proebstel | 725/14 |
| 2008/0133638 | A1* | 6/2008 | Fischer et al. | 709/201 |
| 2008/0216107 | A1* | 9/2008 | Downey | H04N 7/17318 |
| | | | | 725/22 |
| 2012/0169938 | A1* | 7/2012 | Harvey | 348/734 |

OTHER PUBLICATIONS

Ahmed, Waqas, "Block Spotify Ads With One Single Mouse Click Using EZBlocker", Jul. 29, 2013, http://www.techattend.com/block-spotify-ads-with-ezblocker/, pp. 1-5.*

* cited by examiner

*Primary Examiner* — John Schnurr
*Assistant Examiner* — Cynthia Fogg
(74) *Attorney, Agent, or Firm* — Terrile, Cannatti, Chambers & Holland, LLP; Robert W. Holland

(57) ABSTRACT

Viewers use remote controls to generate mute signals based on broadcast programming. Those mute signals are processed into mute messages, which are sent to viewers' television audio controls, which mute and un-mute broadcast audio based on the mute messages. Accurate mute messages are generated based in part on various mute signal statistics derived from mute signal streams. Sending mute signals can result in mute signal point credits, and receiving mute messages can result in mute point debits. Additionally, more accurate mute signals can result in greater mute point credits.

1 Claim, 2 Drawing Sheets

SYSTEMS AND METHODS FOR CONTROLLING BROADCAST AUDIO VOLUME

BACKGROUND OF THE INVENTION

1. Field of the Invention

The present invention relates in general to the field of processing information and more specifically to controlling the playback of media.

2. Description of the Related Art

Some television commercials irritate some viewers. The audio itself can be particularly undesirable. For example, many television advertisements are often louder than other programming while also being unappealing in any other respect. Therefore a diligent television viewer might pick up the remote control and mute the television audio while the advertisement plays. When the advertisement concludes, the viewer un-mutes the audio as the programming resumes. This process is distracting and tedious.

For previously recorded programming stored on a digital video recorder (DVR), the user might elect to fast-forward through the commercials rather than mute the commercial audio. In this case, the viewer's attentiveness and actions are typically still required to avoid loud, distasteful commercial audio content.

Loud television commercials have gotten so bad that the United States Congress passed the Commercial Advertisement Loudness Mitigation (CALM) Act in 2010. However, in the first six months after the legislation went into effect, the Federal Communications Commission (FCC) received 15,580 complaints about loud commercials. Loud television commercials remain widely disliked.

Some technology is available to maintain a volume limit across both program and commercials. Other technology based on video signal processing seeks to identify commercial boundaries. With those boundaries determined, a system could mute the offending audio or, for playback from a recording, skip the undesirable commercials entirely. U.S. Pat. No. 4,750,213 A to Albert P. Novak discloses a method and system for editing unwanted content from transmitted program material. U.S. Pat. No. 8,249,497, to Michael I. Ingrassia and Jeffery T. Lee, describes systems and methods for seamlessly switching media playback between a media broadcast, such as a radio broadcast, and media from a local media library. Another approach simply gives the user a button to skip a three-minute block of recorded video.

SUMMARY OF THE INVENTION

Since typical television programming includes multiple embedded commercials with unreasonably loud and distasteful audio, muting that undesirable audio requires considerable user vigilance. Typical programming schedules present 40 or more advertisements, promotions, and similar clutter per hour. If that clutter is grouped into pods of eight advertisements each, then a vigilant viewer would have to mute and un-mute the audio ten times over an hour. When programming resumes after a commercial break, the viewer could unintentionally respond late and, therefore, miss some of the desirable content. Similarly, a viewer seeking to mute blaring advertising audio might get to the mute button too late and suffer as a result. For example, the car salesman's shouts along with loud music could assault the viewer before the viewer can restore sanity by muting the audio. Therefore a need has risen to reduce the burden of viewers' defenses against loud commercials.

In accordance with the present invention, a system is provided which substantially reduce the disadvantages and problems associated with previous methods and systems for avoiding loud commercials and other undesirable commercial content. Vigilant viewers send mute signals to a system that processes and redistributes those mute signals to other viewers. By aggregating mute signals from multiple viewers of a certain program, the system can estimate when to mute and unmute the audio.

The present invention provides a number of important technical advantages. Viewers can share their muting efforts with other viewers. Multiple viewers collaborate to improve aggregate accuracy while reducing the burden on individuals. Additionally, the invention enables an economy based on the value of the generation and consumption of mute streams. Depending on some of the components used, the systems need not require the cooperation of broadcasters. In addition, the invention does not require any video or audio processing to determine commercial boundaries. Furthermore, this present invention does not impose a volume limit for both commercial and program audio.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

A typical embodiment includes a mute signal receiver, a mute signal processor, an accounting component, a subscription component, and a mute message sender. Typically the mute signal receiver receives a mute signal for a program triggered by a viewer. The mute signal processor analyzes the mute signal using a mute signal stream, which typically includes mute signals from other viewers for the same program. The mute signal processor uses a program identifier associated with the program to obtain data for the mute signal processor's evaluation of the mute signal. The accounting component maintains a mute point balance for the viewer. A subscription component maintains program subscription information, which relates viewers and programs using viewer and program identifiers. When the evidence warrants and a subscribing viewer's mute point balance allows, a typical embodiment uses a mute message sender to send a mute message to a television control device coupled to a television that the subscribing viewer is watching. Using this example system, several viewers can help other viewers avoid obnoxious advertising audio.

DETAILED DESCRIPTION

In the description that follows, the present invention will be described in reference to embodiments that control playback of media. More specifically, the embodiments will be described in reference for controlling broadcast audio volume by receiving, processing, and distributing mute events. However, the scope of the invention is not limited to any particular environment, application, or specific implementation. Therefore, the description of the embodiments that follows is for purposes of illustration and not limitation.

Figure 1:
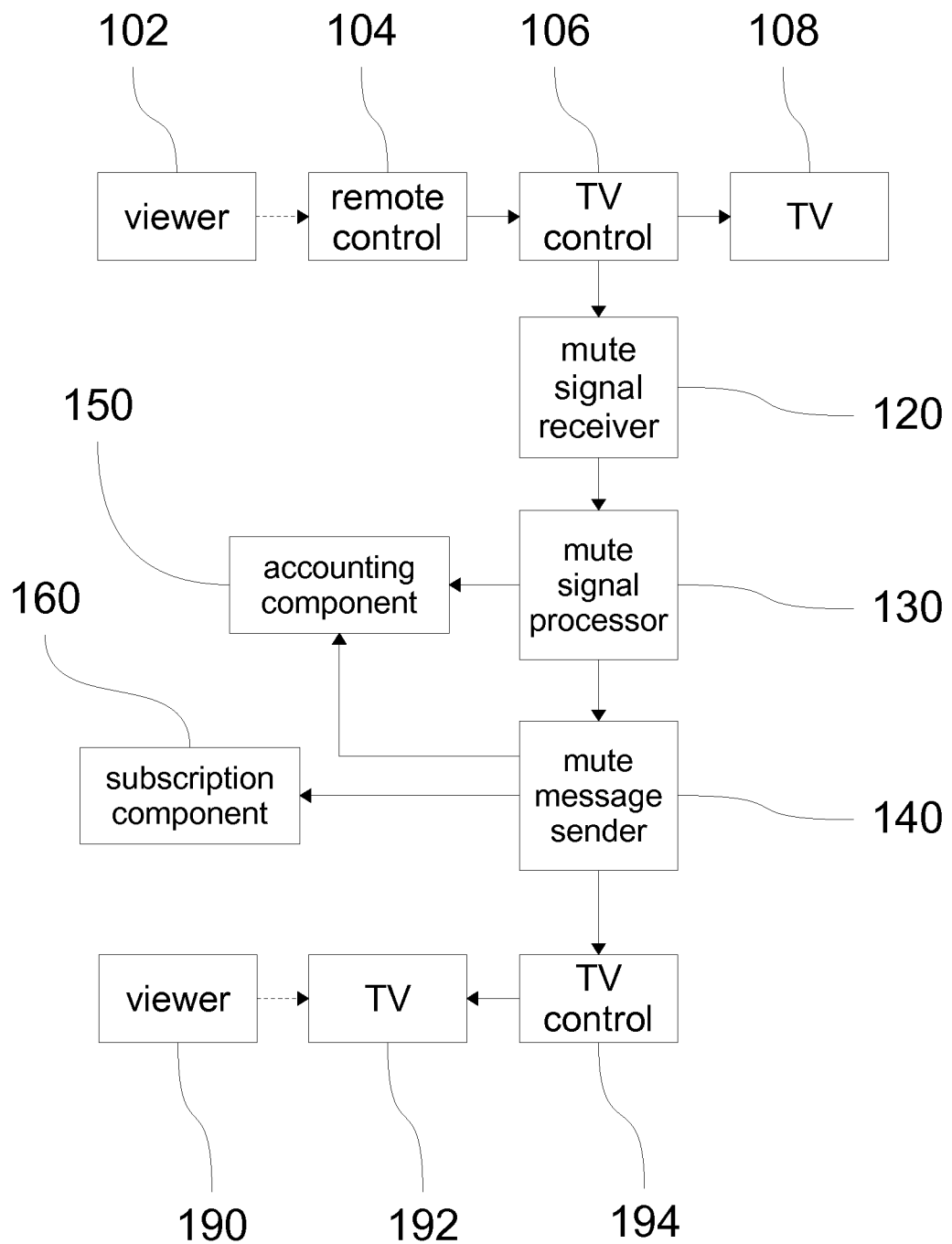
FIG. 1 illustrates a system for controlling broadcast audio volume.

FIG. 1 illustrates a system for controlling broadcast audio volume.

Viewer 102 is watching broadcast television when a horribly loud, obnoxious commercial begins. He picks up remote control 104 and presses the mute button to restore peace. Remote control 104 sends a signal that results in muting the television audio. In addition, that signal results in a mute signal arriving at mute signal receiver 120. For example, remote control 104 could send a signal using infrared light to television control device 106, such as a set-top box, which in turn could send a mute signal to server on the Internet that hosts a mute signal receiver 120 process. That process executes on a computer processor coupled to non-transitory memory such as a solid state disk or a hard disk.

The mute signal received by mute signal receiver 120 typically comprises a channel identifier for the channel that viewer 102 is watching. In addition, the mute signal also typically includes an identifier for the viewer. However, a system could associate a viewer identifier with a mute signal by other means. The viewer identifier is associated with viewer information, including a mute point balance and, optionally, mute signal history data. Alternately or in addition, this mute signal may comprise a program identifier. In typical broadcast systems, a viewer has selected a channel, and that channel is playing a program. In different markets, the same program can be broadcast on different channels. Therefore, in typical embodiments, a component maps a channel identifier to a program identifier. In some embodiments, television control 108 includes this mapping component. In other embodiments, a process on a remote server performs channel mapping.

Mute signal receiver 120 sends data comprising the mute signal's information to mute signal processor 130, which analyzes available evidence from the mute signal stream, which comprises incoming mute signals from multiple other viewers, and other sources to determine if that evidence warrants sending a mute message to all mute message stream subscribers for that program. To obtain relevant evidence, mute signal processor 130 obtains the program identifier base on the mute signal. With this program identifier, mute signal processor 130 obtains the mute signal stream for that program identifier.

In a typical system, remote control 104 is a conventional hand-held television remote control, which might use infrared light to communicate with television control device 106, which can be a typical television set-top box. In this example, television control device 106 would typically send the mute signal to mute signal receive 120. Alternatively or in addition, a smart phone application could serve as remote control 104 that triggers the mute signal. For example, the smart phone application could send a mute signal to mute signal receiver 120 directly. Alternately, the smart phone application could control television control device 106 by sending a signal to television control device 106, which would then send a mute signal to mute signal receiver 120. In this manner, the smart phone application can act as remote control 104 by, in part, triggering a mute signal. Many other variations are possible. For example, mute signal receiver 120 could receive a mute signal sent by a video game console or similar device.

In addition, mute signal processor 130 typically also evaluates the incoming mute signals for quality or other measure of value based in part on the other mute signals in the mute signal stream. In particular, a system can measure a mute signal's proximity to the mute message or other indication of ideal mute time, if any. For example, mute signal processor 130 can re-evaluate mute signals after a majority of all the mute signals for a particular program have arrived. With that more complete information, mute signal processor 130 can evaluate mute signals for accuracy. Mute signals sent just before the estimated best time for a mute message are better than others. Then mute signal processor 130 directs accounting component 150 to credit the mute point account for viewer 102 who sent the mute signal. This credit can reflect the quality of the mute signal.

If the mute signal processor 130 determines that the program should in fact be mute at that moment, then mute signal processor 130 causes mute message sender 140 to send a mute message to all active program subscribers according to subscription component 160. For example, a typical mute message sender 140 will send mute messages to television control devices coupled to a television that is showing the same program that viewer 102 is watching. Subscription component 160 will typically store viewer subscription information, which in part associates viewer 190 with a program identifier that viewer 190 is watching.

For example, viewer 190 could be watching the same program as viewer 102. If viewer 190 has subscribed to the mute message stream service, then viewer 190's television control device 194 would receive a mute message, which would result in muted audio from television 192, much to the relief of viewer 190. A mute message stream comprises a sequence of mute messages for a given program, which is associated with a program identifier. Therefore, viewer 190 previously must have subscribed to one or more mute message streams by accessing the subscription component 160. If television 192 is not currently showing the program that an incoming mute message targets, then television control device 194 will not mute the audio of television 192.

Viewer 190 might elect to subscribe automatically to all programs that he is watching. Alternately, viewer 190 might elect to subscribe in an ad hoc manner. For example, viewer 190 could press a "subscribe to mute message stream" button on his remote control or phone application. If viewer 190 has decided that he wants to ignore mute messages temporarily, he could suspend their processing at television control 194 or in another manner.

In a similar way, this same system can be used to un-mute broadcast audio. In addition to mute signals and messages, the system processes and distributes un-mute signals and un-mute messages. Both mute and un-mute signals are sometimes collectively described as "mute signals." Similarly, both mute and un-mute messages are sometimes collectively described as "mute messages." In each case, multiple signals and messages for a given program occur in mute signal and mute message streams respectively.

Most embodiments allow viewer 102 to also be a mute message subscriber, even for the same program. Viewer 102's attention may wander, but he could still benefit from mute messages that originated from other viewers' efforts.

Mute signal processor 130 can use several evaluation techniques to determine if and when a broadcast could be muted. Most mute signals will arrive after the offending commercial begins. In some cases, very observant viewer could even send mute signals before a commercial begins because characteristics of the programming can suggest that a commercial break is imminent. For example, rolling final credits or a fade to black often indicate a commercial is on the way, as do some timeouts and period ends in sporting events. Therefore there is a need to process many mute signals to estimate when muting is warranted. Mute signal processor 130 therefore processes many mute signals as a mute signal stream. On a per-program basis, mute signal processor computes mute signal stream statistics. One method for determine when a program should be muted proceeds by counting the number of mutes per second. Those counts might increase every second. As an example, once the number of counts reaches a threshold or other measure of mute signal rate, mute signal processor could declare a mute after three approximate doublings of mute signal counts. A late mute might be better than no mute, so a mute signal processor 130 could declare a mute once the mute counts begin to decline. In any case, a typical mute signal processor 130 will require a minimum number of mute signals (for a given program) before declaring a mute.

Together with accounting component 150, mute signal processor can adjust the viewer 102's mute point balance. When viewer 102 sends an especially accurate mute, his mute point balance can increase more than for a badly timed mute. Since mute signal processor 130 must decide when to declare a mute, it (or a related component) can evaluate the accuracy of the mute signals in the stream. In addition, accounting component 150 and mute signal processor 130 can award more mute points for programs that have many mute message stream subscribers but a relatively low number of viewers who sending mute signals. Similarly, when a system sees unhelpfully high mute signal traffic, it could elect to reduce the mute point credit even for high-quality mute signals. More generally, the system can determine a score or similar measure for each mute signal, and the accounting component can adjust the viewer's mute point balance based on this score. Therefore, the mute point score typically reflects the mute signal's proximity with a statistical measurement of the aggregate desires of the multiple other viewers as estimated by many mute signals of other program viewers. In this manner, mute signal processor 130 and accounting component 150 can fairly value viewer 102's efforts. The system rewards viewers for valuable mute signals.

A viewer's mute points could be exchanged for money, products, services, or other benefits. In particular, some systems will charge mute stream subscribers in mute points. In some systems, mute message sender 140 will check with accounting component 150 to verify sufficient mute points before sending the mute message to the subscribing viewer 190. When the mute point balance is sufficient, accounting component 150 will debit mute points when a mute message is delivered to television control device 194. A subscriber who is not willing to mute in return for receiving other mutes at a later time could purchase or otherwise obtain mute points through other means. In systems that support mute point credits for mute signals and mute point debits for received mute messages, mute points become the basis of a mute point economy.

Some systems support mute message feedback in the form of reversed mute signals from subscribers who, for example, receive a mute which is undesirable. In that case, the unhappy subscriber could pick up his remote control and un-mute the audio. As a consequence, an un-mute signal receiver can receive that un-mute message, and an un-mute signal processor would, for example, record the fact that this viewer did not appreciate the previous work that mute signal processor 130 and its associated components performed. The system records that information associated with a characterization of the mute signals that triggered to mute message. Additional processing could then enable mute signal processor 130 to weight mute signals based on the historical record for the program, the identity of viewers who have sent and are sending mute signals, and similar data. In this manner, viewer 190's feedback can influence mute signal processing in the future.

To enable mute signal processor 130 to evaluate and utilize historical mute signal data, which includes previous mute signal processor evaluation data for historical mute signals, a typical system includes a mute signal database that stores this data. Mute signal process 130 or a related component writes to this database as mute signal evaluations proceed.

In another variation, a system can support replaying mute messages for a viewer 190. A mute message store component maintains a datastore using non-transitory memory, and that datastore can serve a sequence of mute messages for programs replayed in whole or in part after the original broadcast. For example, using this system, viewer 190 could pause a live broadcast and resume it minutes later while still benefiting from mute messages either delivered at the appropriate times to television control 194 or recorded while the broadcast was recorded. Additionally, viewer 190, when watching a recorded broadcast, could direct television control 194 to skip video for the duration that mute (and un-mute) messages specify. In this manner, the system enables second viewer 190 to skip commercials in their entirety.

When viewer 190 is watching a recorded program, more information is available to mute signal processor 130 for evaluation. In particular, as the live mute signal stream diminishes for a the beginning of an undesirable commercial, mute signal processor can consider many more mute signals from the mute signal stream, including those signals sent much later than when mute signal processor earlier decided to generate a mute message. With this more complete information, mute signal processor 130 can sometimes obtain a more accurate estimate of the preferred mute moment. Therefore, mute signal processor might choose to emit a mute message at a different time than that for the original mute message. In a typical system, these revised mute messages can be stored and used for mute message stream subscriptions for programs which viewers watch later. In particular, in some embodiments, mute message sender 140 will send revised mute messages to television control device 194 when viewer 190 is watching a recorded program. Such systems will use a mute message database to store revised mute messages, and mute processor 130 can subsequently use this data to improve its mute signal evaluations.

In another variation, viewer 190 might prefer his volume be lowered rather than muted in response to a mute signal. Therefore, television control device 194 might support such an option. Alternately, mute message sender 140 might send a low-volume message instead of mute message to viewer 190.

Some embodiments record mute signal histories. In one variation, the system can record mute signal histories along with other data used by mute signal processor 130, which can then use this data to weight new mute signals. For example, a system could compute and maintain statistics for each viewer who submits mute signals. Those statistics can reflect confidence, accuracy, or similar measures of the quality of mute signals from those viewers. When one of those viewers sends a new mute signal, mute signal processor 130 can weight that mute signal based on those statistics for that viewer. A mute signal from a viewer who historically mutes with high accuracy, as previously determined from data and mute processor 130's previous evaluations, will receive a higher weight than mute signals from users with little historical data or poor track records.

In another variation, a system can provide information to viewers to report system state. In particular, such a system can display selected viewer names and associated statistics obtained from current historical mute signal data. For example, a system can display the "top muters" by time period, program, region, and/or other characteristic(s). Such a display typically includes user names and associated mute signal statistics. A companion application, such as a smart phone application, can provide an additional means for communicating this information to viewers. In particular, such a smart phone application can display a "mute leader board" and similar data. This kind of information and interface can provide an experience similar to that of a video game. This functionality encourages viewers to compete to see who mutes the best.

To provide more feedback for a mute signal from viewer 102, some example systems can display a message to viewer 102. For example, a system could send the message "good job" or similar textual feedback to viewer 102 when mute processor 130 determines that his mute signal was a high quality event. This feedback can often be provided soon after mute processor 130 determines that a mute message is warranted. Similarly, mute processor 130 could determine that viewer 102's mute signal was very late. In that case, an example system could report that tardiness to viewer 102. Again, a companion application could communicate these messages to viewers.

Sometimes a popular program might attract a low number of mute signals even though the audience for the program is large. In such situations, a system can encourage more viewers to send mute signals by offering additional mute point credits for good mute signals. For example, a system could run a "twice the points" promotion to attract more mute signals for a popular program that is getting too little attention from mutes. In this case, accounting component 150 or a related component would adjust mute point credits to reflect the promotion.

In addition to broadcast television, this invention applies to a wide range of media in different formats and via different presentations. For example, as mentioned above, a system could control the audio for streaming content that contained embedded commercials as most broadcast television does. As another example, a system could control audio for radio broadcasts or other audio-only media with embedded commercial content. Therefore, the terms "mute" and "viewer" should be considered as exemplary.

Additionally, in a typical system, mute signal receiver 120, mute signal processor 130, mute message sender 140, and other components are provided by a computer with non-transitory memories to store computer programs and data. For example, in a typical system, television control device 106 sends a mute signal in the form of a TCP/IP message to an Internet-accessible server, which routes the mute signal to a mute signal receiver hosted by a server in a datacenter. Mute message sender 140 sends a mute message as a TCP/IP message to television control device 194 via a network supporting TCP/IP. Television control device 194 then mutes television 192.

Figure 2:
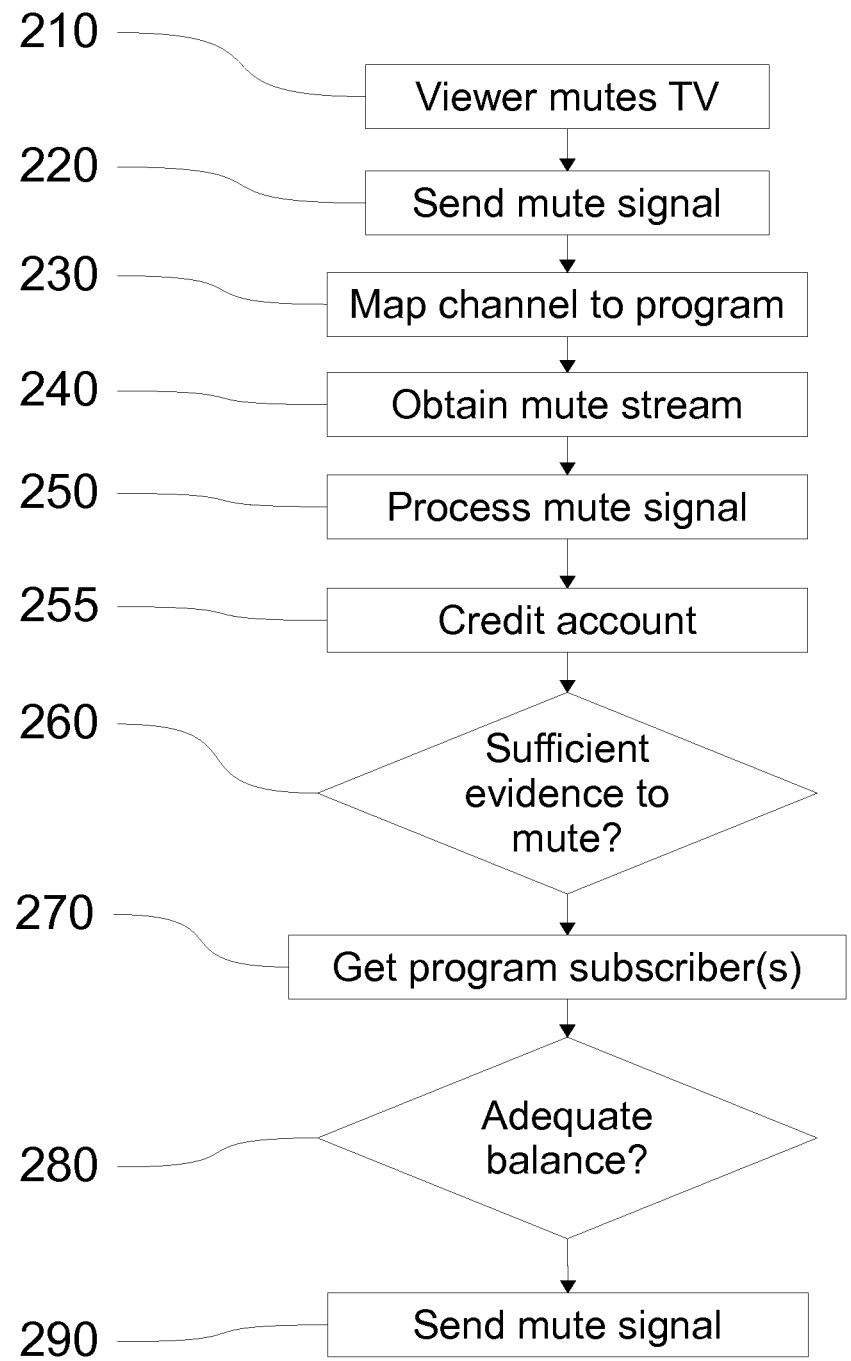
FIG. 2 is a flow chart depicting a method for controlling broadcast audio volume.

FIG. 2 is a flow chart depicting a method for controlling broadcast audio volume.

In step 210, a viewer mutes his television as an obnoxious commercial seeks to inflict itself on the viewer. This action triggers step 220, which sends a mute signal to an Internet-accessible server. The mute signal includes a channel identifier and additional information sufficient to map that channel identifier to a program identifier in step 230. If a channel at a given time is uniquely associated with a program, the step 230 may not be necessary. In step 240, other mute signals for the same program are provided to step 250, which processes these mute signals from multiple viewers as a mute signal stream. In step 255, the viewer's mute signal may result in a mute point credit based on a mute point score or similar measure. If the mute signal was especially inaccurate, only a very stern system would debit a mute point credit. As discussed above, steps 250 and 260 determine if and when a mute is warranted. If a mute is declared at step 260, then a subscriber's mute point balance is verified at step 280. If sufficient funds exist, a mute message is delivered in step 290 to a device that controls the volume for the subscriber's television. Additionally, the system might enter a debit in subscriber's mute point account.

These systems and methods can be used to estimate the beginning and end of content with various characteristics. In many of the examples above, the focal content was undesirable television commercials; however, using these systems and methods, viewers can target a wide range of content with predetermined characteristics. In these cases, the mute and unmute events generalize to start and stop or beginning and ending events.

The figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill in the art without departing from the scope and spirit of the invention. Embodiments were chosen and described in order to best explain the principles of the invention and the practical application, and to enable others of skill in the art to understand the invention for various embodiments with various modifications as are suited to the particular use contemplated.

What is claimed is:

1. A method for controlling television audio, the method comprising:
 receiving from a television control device operated by a first viewer a mute signal comprising a channel identifier and a viewer identifier that identifies the first viewer;
 mapping the channel identifier to a program identifier;

processing a mute signal stream that comprises the mute signal and other mute signals from other viewers;

determining if the mute stream indicates that a second viewer should receive a mute message;

maintaining a first mute point balance for the first viewer; and sending a mute message over a compute network to a television control device coupled to a television that the second viewer is watching;

wherein:

the first viewer is watching a program identified by a program identifier;

a mute signal processor obtains the program identifier based on the mute signal;

subscription information associating the program identifier with the second viewer;

the second viewer is watching the program;

the mute signal processor performs an evaluation of the mute signal to estimate when the first viewer desired the program to be muted;

the mute signal processor computes mute signals stream statistics comprising counts of mute signals per second;

the mute signals stream further comprises an un-mute signal from the second viewer;

the processing records the un-mute signal for weighting the mute signal for a third viewer; and the television control device mutes the program for the second viewer when the television control device receives the mute message.

\* \* \* \* \*